April 3, 1945.   H. E. BEDFORD   2,373,009
FIRE-FOAM PRODUCING APPARATUS
Filed Aug. 7, 1942   2 Sheets-Sheet 1

INVENTOR
Howard E. Bedford
BY
ATTORNEY

April 3, 1945.  H. E. BEDFORD  2,373,009
FIRE-FOAM PRODUCING APPARATUS
Filed Aug. 7, 1942  2 Sheets-Sheet 2

INVENTOR
Howard E. Bedford
BY
ATTORNEY

Patented Apr. 3, 1945

2,373,009

UNITED STATES PATENT OFFICE 2,373,009

FIRE-FOAM PRODUCING APPARATUS

Howard Edwin Bedford, Brentford, England, assignor, by mesne assignments, to Pyrene Development Corporation, Newark, N. J., a corporation of Delaware Application August 7, 1942, Serial No. 453,991
In Great Britain June 7, 1941

8 Claims. (Cl. 261—116)

One of the most successful methods of producing foam for fire-extinguishing purposes consists in intimately mixing together water, a foam-generating compound and air, so as to produce what is commonly known as air foam. This is a mechanical process as distinguished from chemical processes in which chemical reaction takes place with evolution of gas.

One way of bringing about the mixing involves the entrainment of air by liquid under pressure. Apparatus that has proved successful in practice is shown in the patents to Friedrich Nos. 2,003,184, 2,073,204 and 2,086,711, but with this form of apparatus much energy is lost, partly because air that is not usually employed is drawn in and partly by turbulence. As a result, the apparatus cannot be used for some purposes; in particular it will not produce air foam with an adequate degree of expansion for extinguishing purposes and under a sufficient pressure to enable the foam either to be driven up a riser pipe on the side of an oil tank, which may be as much as 45 feet high, or to be delivered into the bottom of such a tank against the pressure of the oil on it. It is possible to deliver the foam under sufficient pressure if air is supplied under pressure of the foam-generating apparatus, but, as will readily be appreciated, this involves the provision of an air compressor or a similar apparatus.

The principal object of this invention is to produce a jet of foam having such driving power that it will flow up a tall riser pipe or enter an oil tank against the pressure of the oil in it and yet will have an adequate degree of expansion.

Another object of the invention is to provide an apparatus which will produce a powerful forcing jet of foam.

The invention is based on my discovery that the amount of atmospheric air drawn in should be correlated with the amount of water and with the nature of the foam compound used. In particular, whereas previously the amount of air drawn in has been substantially uncontrolled and its volume in relation to that of the water has been very large, it is necessary, I have found, to restrict the volume of air. In my invention, I so correlate the total quantity of water and the foam compound that the resultant solution is capable of yielding a foam having at least six times the volume of the solution, and preferably eight times that volume. I control the volume of air that is entrained by making the ratio of the smallest total area through which all the air must pass to the total area of the orifice or orifices from which the jet or jets of liquid emerge lie between 5:1 and 12:1. The greater the capacity of the solution for producing foam, the larger should be this ratio. Thus, if the solution will produce foam having at least eight times its volume, the ratio of the areas referred to is preferably between 8:1 and 10:1.

In order to determine the volume of foam produced by a given solution, the following method may be used. 30 c. c. of the solution is shaken vigorously for 5 seconds in a 500 c. c. stoppered flask, and the volume is measured after this shaking.

The complete solution may be formed and then used as the liquid that entrains the air or the water may be used to entrain both the air and the foam compound, the solution then being formed during the mixing with the air.

I find it best to use apparatus in which several jets of water intersect and draw in air behind them, but a single jet may be used. Moreover, the air may be entrained in stages, and then there may be one jet or a series of jets at each stage. In such a case it is the ratio of the total area of the orifice or orifices in the first stage to the smallest cross-sectional area at the last stage through which all the entrained air must pass that is the critical factor.

My invention is illustrated by the annexed drawings, in which.

Figure 1:
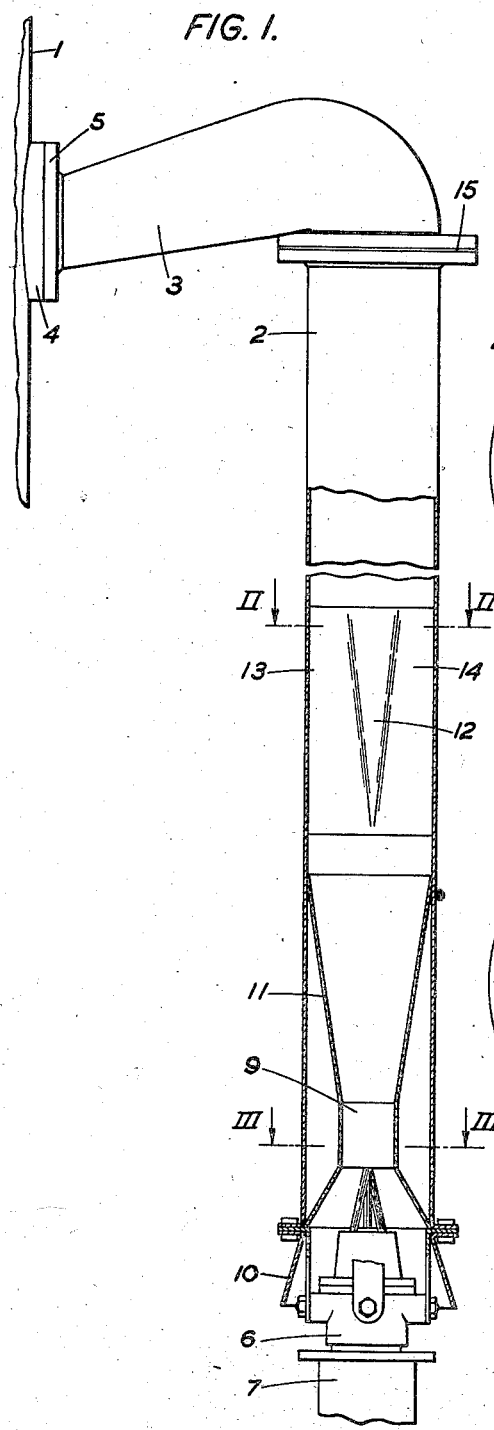
Figure 1 is an elevation, partly in section, of one apparatus.
Figure 2:
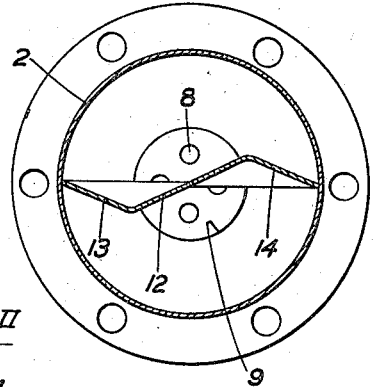
Figures 2 and 3 are sections on the lines II—II and III—III respectively in Figure 1.
Figure 3:
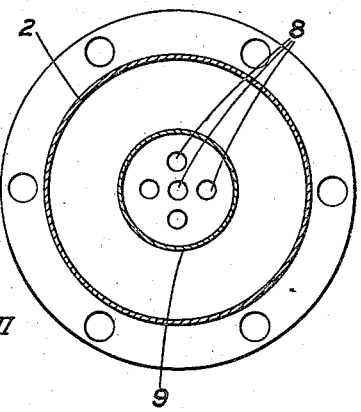

Referring first to Figures 1 to 3, the apparatus is intended for the protection of an oil tank 1 into which foam is to be introduced at the bottom against the pressure of the oil in the tank if that oil should catch fire. The apparatus comprises a vertical pipe 2 connected at the top to provide a part 3 that runs substantially horizontally to a flanged opening 4 in the wall of the tank and that is fixed to the tank at the opening by a flanged end 5.

At the base of the pipe 2 there is a foam-producing unit comprising a jet-nozzle head 6 which is connected to a pipe 7 through which a solution of foam compound in water is supplied.

The head 6 is formed with five bores 8, each having an orifice ½ inch in diameter, which deliver jets of liquid that intersect at the entrance to a throat member 9. The head 6 and the jets are surrounded by a conical shield 10, the end of which is open to the atmosphere, so that the amount of air that is entrained is controlled by the diameter of the throat, which is 3½ inches. Thus the ratio of the cross-sectional area of the throat to the total cross-sectional area of the orifices is just under 10:1.

The mixture of solution and air travels from the throat through an expanding cone 11 into the pipe 2. It there encounters a baffle consisting of a piece of sheet metal bent to form a central triangular part 12 that lies parallel to the axis of the pipe with its apex nearest the head 6, and two wing parts 13 and 14 that lie in planes inclined to the axis of the pipe and that cause the foam to swirl as it travels through the pipe. The existence of this baffle may destroy a small amount of the energy of the jet or jets but it is found to lead to more intimate mixing of the ingredients of the foam and thus to foam of a finer structure. If all the energy of the jet or jets is required, the baffle should be omitted.

In order to prevent the escape of oil vapour from the tank 1, a frangible seal 15 is placed across the pipe 2 at its junction with the part 3. This seal is broken when the apparatus is put into use, and it is found that this can easily be done by the power of the foam jet when the air is restricted in the way described. Without such restriction it is necessary to use a seal so weak that it may be broken simply by the pressure inside the tank 1.

Figure 4:
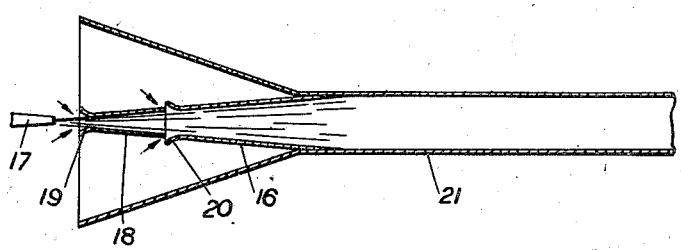
Figure 4 shows another apparatus diagrammatically.

Figure 4 shows two jets arranged in series. The liquid passes from a jet nozzle 17 to a pipe 18 having a flared end 19 through which air is entrained, and the mixture then enters an expanding pipe 16 having a flared end 20 which delivers into a cylindrical pipe 21. In this apparatus the ratio of the cross-sectional area of the throat of the pipe 16 to that of the orifice of the jet nozzle 17 must be between 5:1 and 12:1.

Figure 5:
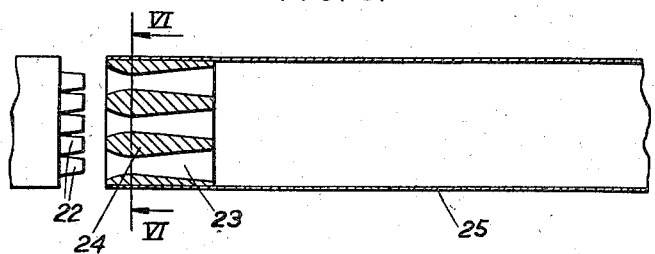
Figure 5 shows a third apparatus diagrammatically.
Figure 6:
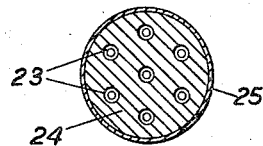
Figure 6 is a cross-section on the line VI—VI in Figure 5.

In the apparatus shown in Figures 5 and 6, a number of liquid jets are arranged in parallel and each enters a throat and entrains air in so doing. The jet nozzles are shown at 22 and the throats at 23, being formed in a member 24 which occupies the end of a pipe 25. Again the total throat area must bear the specified ratio to the total orifice area and if all the orifices are of the same size and all the throats of the same size, as is the case in the apparatus shown, each throat must bear this ratio to each orifice.

Figure 7:
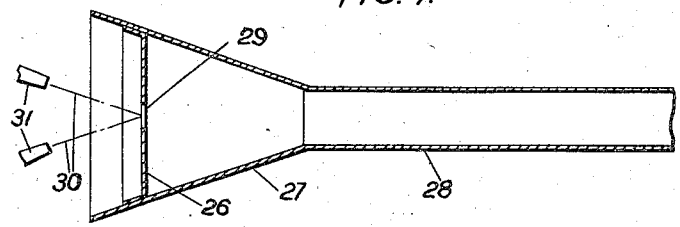
Figure 7 shows yet another apparatus diagrammatically.

Figure 7 shows an apparatus in which, instead of providing a throat proper, a plate 26 is placed across the flared end 27 of a pipe 28 and is formed with a central opening 29 into which a number of water jets 30 are delivered through orifices 31. Here, of course, it is the area of the opening 29 that must be from five to twelve times the total area of the orifices 31.

I claim:

1. In apparatus for producing fire extinguishing air foam under sufficient pressure to flow up a tall riser pipe, nozzle means having one or more orifices for projecting aspirating jets of liquid, a conduit having a restricted throat for receiving such jets and conveying foam formed thereby, and a passageway adjacent the throat of said conduit for admitting air under atmospheric pressure, said passageway being restricted so that its smallest cross-sectional area is from 5 to 12 times the total orifice area of said nozzle means.

2. In apparatus for producing fire extinguishing air foam under sufficient pressure to flow up a tall riser pipe, nozzle means having one or more orifices for projecting aspirating jets of liquid, a conduit having a restricted throat for receiving such jets and conveying foam formed thereby, and a passageway adjacent the throat of said conduit for admitting air under atmospheric pressure, said passageway being restricted so that its smallest cross-sectional area is from 5 to 12 times the total orifice area of said nozzle means, and said conduit having means therein for imparting a whirling motion to foam passing therethrough.

3. In combination with an oil tank, a means for producing fire extinguishing air foam and introducing such foam into the tank comprising a conduit having one end connected to said tank near the base thereof for introducing foam into the tank against the head of oil therein, nozzle means having one or more orifices for projecting aspirating jets of liquid into the other end of said conduit to produce a stream of foam therein, and a passageway associated with said other end for the introduction of air under atmospheric pressure, the smallest cross-sectional area of said passageway being adjacent the point at which said jets of liquid are projected into said conduit and being about 5 to 12 times the total orifice area of said nozzle means.

4. Apparatus for producing foam for fire extinguishing purposes which comprises means having one or more orifices for discharging a jet or jets of foam forming liquid, said liquid being capable of forming stable foam with a predetermined number of volumes of air, a receiver open to atmosphere into which said jet or jets are discharged in a manner to aspirate air, and means associated with said receiver for restricting the minimum cross-sectional area of the passageway for the air to not more than the total minimum cross-sectional area of said jet or jets multiplied by double said predetermined number and to not less than five times said minimum cross-sectional area of said jet or jets.

5. Apparatus for producing foam for fire extinguishing purposes which comprises nozzle means having one or more orifices for discharging one or more jets of foam forming liquid, a receiver open to the atmosphere into which said jets are discharged in a manner to aspirate air, said liquid being capable of forming stable foam with a predetermined number of volumes of air, said receiver having a restricted throat adjacent the point at which said jets are discharged into the same, the cross-sectional area of said throat being not less than several times the total cross-sectional area of said orifices and not more than said total area multiplied by double said predetermined number.

6. Apparatus for producing foam for fire extinguishing purposes which comprises nozzle means having one or more orifices for discharging one or more jets of foam forming liquid, a receiver open to the atmosphere into which said jets are discharged in a manner to aspirate air, said liquid being capable of forming stable foam with a predetermined number of volumes of air, said receiver having a restricted throat adjacent the point at which said jets are discharged into the same, the cross-sectional area of said throat being not less than several times the total cross-sectional area of said orifices and not more than said total area multiplied by 1.25 times said predetermined number.

7. Apparatus for producing foam for fire extinguishing purposes which comprises nozzle means having one or more orifices for discharging one or more jets of foam forming liquid, a receiver open to the atmosphere into which said jets are discharged in a manner to aspirate air, said liquid being capable of forming stable foam with a predetermined number of volumes of air, said receiver having a restricted throat adjacent the point at which said jets are discharged into the same, the cross-sectional area of said throat being not less than five times the total cross-sectional area of said orifices and not more than said total area multiplied by 1.50 times said predetermined number.

8. Apparatus for producing foam for fire extinguishing purposes which comprises nozzle means having one or more orifices for discharging one or more jets of foam forming liquid, a receiver open to the atmosphere into which said jets are discharged in a manner to aspirate air, said liquid being capable of forming a stable foam with a predetermined number of volumes of air, said receiver having a restricted throat through which said liquid and the aspirated air must pass, the cross-sectional area of said throat being such as to restrict the amount of air passing therethrough to substantially the quantity required to provide said predetermined number of volumes.

HOWARD E. BEDFORD.